Patented Aug. 12, 1947

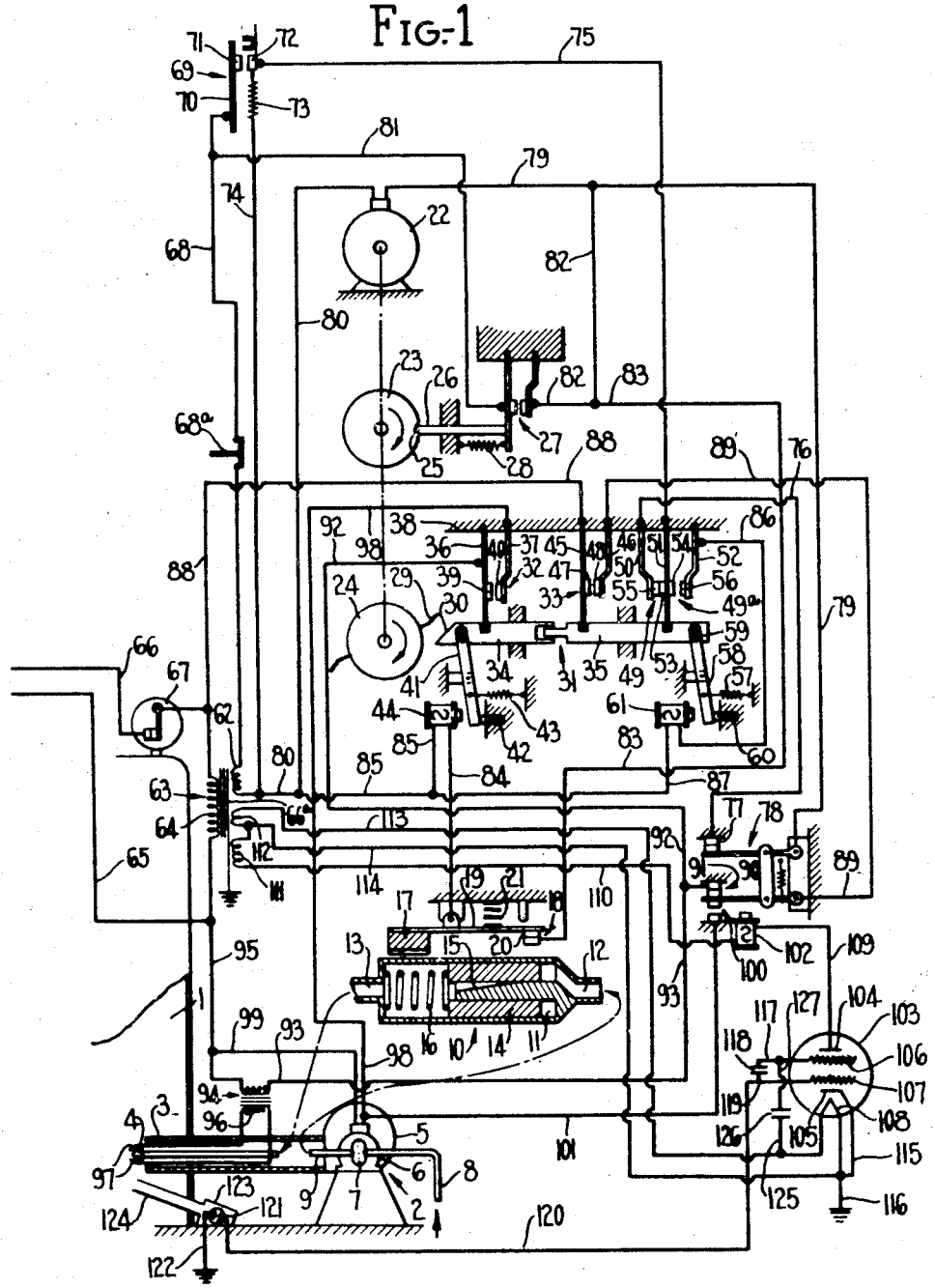

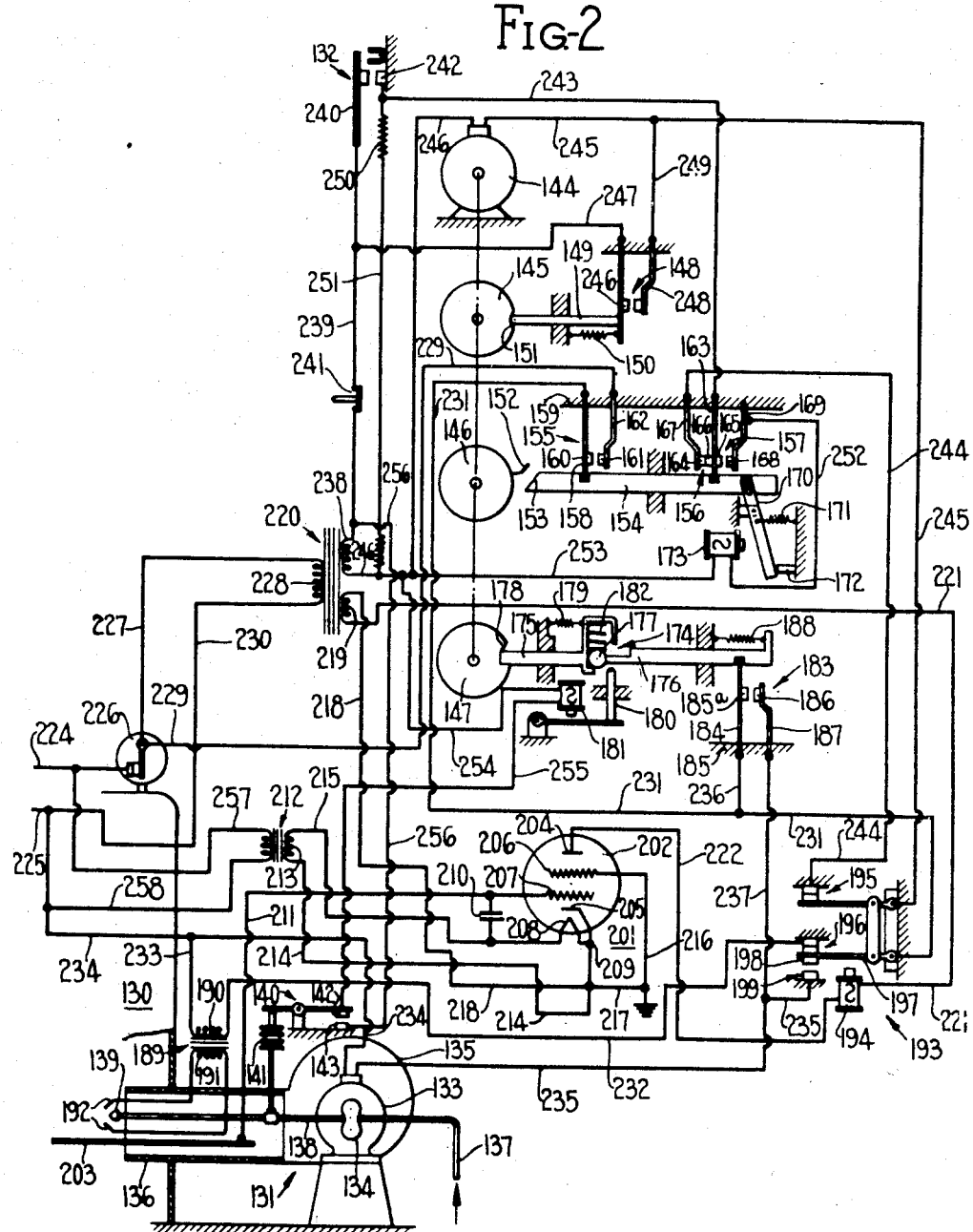

2,425,589

UNITED STATES PATENT OFFICE 2,425,589

FUEL PRESSURE RESPONSIVE BURNER CONTROL SYSTEM

Fred B. Aubert, Grosse Pointe, Mich.

Application August 25, 1941, Serial No. 408,139

21 Claims. (Cl. 158—28)

This invention relates to new and useful improvements in control apparatus and more particularly to an apparatus for controlling the operation of a fluid fuel burner.

An object of the invention is to provide a control apparatus which will be safe in operation.

Another object is to provide a burner apparatus having intermittent ignition in which ignition will be turned on when flame is absent at the burner.

Another object is to provide an electron discharge means for controlling operation of a relay included in the burner control apparatus.

Another object is to provide means to render the electron discharge means effective over a wide range of line voltage.

Another object is to provide means to stop operation of the burner upon excessive dissipation or drain of the negative charge on the control grid of the discharge means.

Another object is to provide means to assure establishment of ignition prior to discharge of fuel at the burner.

Another object is to stop the discharge of fuel substantially instantly after a proper spraying pressure occurs, provided there is no ignition of fuel at the burner.

Another object is to provide a predetermined trial starting period for proper operation of the burner.

The invention consists in the novel system or apparatus and the cooperative relation of parts, to be more fully described hereinafter and the novel features of which will be particularly pointed out and distinctly claimed.

In the accompanying drawings, to be taken as a part of this specification, there is fully and clearly shown several preferred embodiments of the invention, in which drawings:

Figure 1 is a diagrammatic view of an oil burner control apparatus embodying the invention, and Fig. 2 is a diagrammatic view of a similar apparatus but having certain changes in the operating circuits and showing certain alternative control devices.

In the drawings, Figure 1, numeral 1 designates a heating apparatus such as a boiler or furnace for heating a medium such as water or air for direct use or for supplying heat to rooms and for other purposes. The heat exchange medium in the heating apparatus is heated by a fluid fuel burner 2 such as an oil burner which will be of the gun or pressure type. The burner 2 has a combustion air discharge tube 3 and a cooperable fuel nozzle 4 for supplying a combustible mixture of air and fuel at the burner and within the combustion space of the heating apparatus 1. The air tube or duct 3 is supplied with air by a fan or blower 5 driven by an electric motor 6 which also drives a fuel pump 7. A conduit or pipe 8 leads from a source of oil or other liquid fuel to the pump 7 from which a delivery pipe 9 leads to the nozzle 4. Intercalated in the pipe 9 there is a differential pressure and flow indicating means 10 in the form of a hollow cylinder of non-magnetic material, having a pressure chamber 11 with an inlet 12 from the pump and an outlet 13 leading to the nozzle 4. Within the chamber 11 there is a pressure responsive piston 14 of magnetic material serving as an armature and having a longitudinal fuel port or passageway therethrough into which a metering valve 15 extends to control flow through and to close the conduit 9. The valve 15 permits a slight leakage so that air will not be trapped in the oil line or conduit and to assure the spraying of oil from nozzle 4 upon the occurrence of pump discharge spraying pressure. A spring 16 regulates the movement of piston 14 by pump pressure and determines the differential of fluid pressure in the conduit 9 on the opposite faces of piston 14 at which the piston 14 will be moved sufficiently into the magnetic field of a switch operating magnet 17 to actuate and open the flow and pressure switch 18. The magnet 17 is secured to one end of a lever 19 which at its other end carries the movable contact 20 of the switch 18, the lever 19 being resiliently held in and urged to switch closed position by a spring 21. It should be noted that ultimate metering is at the nozzle 4 and that there will be a back pressure against piston 14 acting in conjunction with spring 16 so that the piston is held in its magnet attracting position by a differential of fuel pressure.

A timer means including a low voltage rotary timer motor 22 having a drive shaft carrying switch operating cams 23 and 24 controls the starting of the burner motor 6 and also operates at the end of a predetermined interval to stop operation of the motor 6 if a proper flame is not burning. The cam 23 has a peripheral recess or depression 25 within which seats one end of a guided thrust rod 26 which is forced out of the recess 25 immediately following energization and starting of motor 22, to ride thereafter on the circumference of the cylindrical cam for the remainder of a substantially complete cam revolution. The thrust rod or member 26 by its longitudinal movement, on movement out of the recess 25, closes the holding switch 27 which is urged to open position by a spring 28. The switch 27 is thus held closed during the burner trial starting period or interval of rotation of cam 23. The cam 24 has one or more cam fingers 29 of which the first acts against the inclined cam surface 30 of a guided two-part thrust member 31 subsequent to and preferably immediately following the closure of switch 27. Endwise movement of member 31 by cam 24 acts to close the independently releasable pump motor switches 32, 33. The member 31 comprises rods 34 and 35 having a slip fit or lost motion connection therebetween. The switch 32 comprises a pair of resilient metallic switch arms or blades 36, 37 secured in spaced relation and at one end in a support 38 of electric insulating material. The blade 36 extends at its free end into a transverse slot in rod 34 so that the blade 36 is movable by and with the rod 34 to operate the switch 32. The blade 36 carries a contact 39 engageable with contact 40 of blade 37 upon operation of member 31 by cam 24, the resiliency of blades 36 and 37 permitting overtravel of the rod 34 upon switch closure and assuring a quick breaking of contact upon release of rod 34. Pivoted by a pin and slot or similar connection to rod 34, there is a armature lever 41 pivoted intermediate its ends and having its free end engageable with a stop 42 which may be adjustable to regulate the spacing of contacts 39 and 40 in open position, the lever being normally held against stop 42 by a spring 43. The free end of lever 41 also provides an armature cooperable with an electromagnet 44 which is ineffective to move the lever 41 from its open switch position but is operable to hold the lever 41 in its cam actuated position thereby maintaining switch 32 in closed position after release of rod 34 by cam finger 29. The stop 42 may also be adjustable to regulate the position of lever 41 relative to magnet 44 so that the magnet will be ineffective to close the switch 32. The switch 33 has resilient metallic arms or blades 45, 46 carrying contacts 47, 48 respectively, and secured in spaced relation at one end to the insulating support 38. The blade 45 extends at its free end into a transverse slot in the rod 35 so that upon take-up of the slight lost motion in member 31 the endwise movement of rod 35 by cam 24 will close switch 33, engaging contact 47 with contact 48. The resilience of blades 45, 46 permits overtravel of member 31 to assure closing of switch 33 and also provides a sharp break of contact engagement on switch opening movement. Also carried by the insulating support 38 there is a double throw switch comprising switches 49, 49ª having resilient metallic arms or blades 50, 51, 52 of which the switch operating blade 51 extends at its free end into a transverse slot in rod 35 for movement thereby and therewith. The blade 51 has opposite facing contacts 53, 54 cooperative respectively with contact 55 of blade 50 and contact 56 of blade 52. The resilience of blades 45, 46, 50, 51 and 52 likewise permits of a good contact make on switch closure and of a sharp break on switch opening. The rod 35 is held and urged toward a position to maintain switch 33 open, switch 49 closed, and switch 49ª open by means of a coil spring 57 acting through an armature lever 58 pivoted intermediate at its ends and having one end connected by a pin and slot or similar connection as at 59, to rod 35. The rod 35 is limited in its movement toward cam 24 by means of stop 60 engageable with the free end of lever 58 and opposing spring 57. The free end of lever 58, upon closure of switch 33, opening of switch 49, and closure of switch 49ª is positioned in holding relation to an electromagnet 61 which is ineffective when energized to overcome spring 57, exerting a sufficient force only to hold rod 35 in its cam actuated position. The stop 60 may be adjustable to regulate the position of lever 58 with respect to magnet 61 prior to operation of member 41 by cam 24 so that energization of the magnet 61 will not operate the rod 35.

The timer motor 22 is energized from the secondary low voltage winding 62 of a combined step-up and step-down transformer 63 having a primary winding 64 with its terminals connected to the main service line or lead wires 65, 66, preferably a 110 volt circuit. The transformer 63 preferably has a shield 66ª to block electrostatic flux but which will of course permit free passage of electromagnetic flux. In the lead wire 66 there is a normally closed safety or limit switch 67 responsive to the heating apparatus temperature or pressure to break the main line circuit in the event of high or excess temperature or pressure of the heating apparatus. From the secondary 62, which may be 24 volts, a lead wire 68 extends to one terminal of a control switch 69 such as a room thermostat for controlling operation of the fuel burner. The switch 69 has a bimetal blade 70 connected to lead wire 68 and has a contact 71 engageable with a fixed contact 72 upon demand for increase of temperature by the thermostat. An electric resistance heater 73 is connected by a lead wire 74 to the other terminal of the secondary 62 and impresses a false ambient temperature upon the blade 70 to compensate for lag of response of the thermostat to increasing temperature change. The thermostat contact or terminal 72 is connected by a lead wire 75 to the switch blade 51 and through closed switch 59 and a lead wire 76 to the fixed contact of a closed relay switch 77 of a flame operated relay 78. The movable contact of switch 77 is connected by a lead wire 79 to one terminal of the timer motor 22. From the other terminal of the motor 22 a lead wire 80 returns to the transformer secondary 62.

The thermostat shunt switch 27 has its movable blade connected by a lead wire 81 to the transformer secondary lead wire 68. The other blade or contact of switch 27 is connected by a lead wire 82 to the timer motor lead wire 79. From the lead wire 82 a branch lead wire 83 connects to the fixed contact of the flow switch 18. The holding magnet 44 is connected by a lead wire 84 to the movable contact 20 of flow switch 18 and is connected by a lead wire 85 to the transformer lead wire 80. The holding magnet 61 is connected to the open contact 56 of switch 49ª by a lead wire 86 and has its other terminal connected by a lead wire 87 to the transformer secondary through return wires 85 and 80. From the limit switch terminal of transformer primary 64 a lead wire 88 connects to the movable blade 45 of motor switch 33 which has its blade 46 connected by lead wire 89 to the double throw arm 90 of relay 78. The arm 90 engages the fixed contact of a switch 91 from which extend lead wires 92, 93, the lead wire 92 being connected to the movable arm 36 of motor switch 32 and the lead wire 93 being connected to one terminal of the primary winding of an ignition transformer 94. From the other primary terminal of the transformer 94 a lead wire 95 connects to the main service lead wire 65. The secondary winding 96 of the ignition transformer is connected by lead wires to the spark or ignition electrodes 97 having their spark gap positioned in the path of the combustible mixture discharge from the burner. The motor switch 32 has its other switch arm 37 connected by a lead wire 98 to one terminal of the burner motor 6, the other terminal of which is connected by a lead wire 99 to the lead wire 95 and thence to the service lead wire 65. The arm 90 of relay 78 is cooperable on relay energization to engage the fixed contact of a switch 100 from which a lead wire 101 extends to the terminal connection of burner motor 6 with lead wire 98, so that switch 100 is in parallel or shunt circuit with the motor starting switch 32. The relay 78 is controlled by an electron discharge means and has a relay coil 102 operable when energized to open the switches 77 and 91 and to close the switch 100. In circuit with the relay 102 there is an electronic tube or valve 103 in an electrical net work and having a plurality of control electrodes, namely an anode 104 and a cathode 105. The tube 103 may, for example, be one such as the 2050 Radiatron which together with hereinafter designated condensers has been found to provide satisfactory operation. Positioned between the anode and the cathode there is a screen grid 106 and a control grid 107, the cathode being heated by a filament heater 108. The relay coil 102 has one terminal connected by a lead wire 109 to the anode 104 and has its other terminal connected by a lead wire 110 to one terminal of the step-up secondary winding 111, which may for example provide 142 volts, of transformer 63. The other terminal of winding 111 connects to a low voltage transformer winding 112 which may provide, say 6 volts. The terminals of the winding 112 are connected by lead wires 113, 114 to the filament 108. Extending from the intermediate lead wire 114 which is connected at one end between windings 111 and 112, there is a lead wire 115 which connects to the cathode 105, the junction of lead wires 114 and 115 being connected to ground by lead wire 116. Extending from the screen grid 106 there is a lead wire 117 which is secured to one plate or side of a fixed condenser 118 which may, for example, have a capacity of 100 M. M. F. From the other plate or side of condenser 118 lead wire 119 connects to the control grid 107. This lead wire 119 is connected by a lead wire 120 to the cathode of a photoelectric cell 121 which has its anode connected to ground by lead wire 122. The cell 121 is housed in a light eliminating casing 123 having a light ray admitting tube 124 opening thereinto. The tube 124 is focused on the cell 121 for impingement thereon of light rays from the burner flame, the tube eliminating transmission to the cell of extraneous light rays. The cell 121 is preferably one which will respond only to the higher wave bands and will not be rendered conductive by wave lengths at the lower end of the spectrum. The transformer lead wire 113 which connects to the filament has a branch lead wire 125 connected to one plate or side of a condenser 126 which has its other plate or side connected by a lead wire 127 to the screen grid lead wire 117, the condenser 126 having, for example, say a capacity of 200 M. M. F. The foregoing net work also compensates for variations in line voltage so that with a normal 110 volt circuit, the system will function over a range from about 80 volts to 135 volts. This compensation results from the characteristics of the valve 103 in relation to the condensers 118, 126 and the winding of transformer secondary 112.

The operation of the burner control apparatus is as follows: When the room thermostat 69 calls for heat upon a decrease of room temperature so as to engage contact 71 with contact 72, the manual switch 68ᵃ from the transformer being closed, current will flow from the transformer secondary 62 through lead wire 68, the thermostat 69, lead wire 75, closed switch 49, lead wire 76, closed relay switch 77, lead wire 79 to the timer means or motor 22 and thence via lead wire 80 back to the transformer secondary 62. The energization of motor 22 will rotate cams 23 and 24. Initial rotation of cam 23 will act through thrust rod 26 to close the timer motor maintaining switch 27 within a few degrees of rotation or a few seconds after energization of motor 22, so that the room thermostat 69 will be shunted and thus rendered ineffective to stop the timer motor until its cycle is completed. Closure of switch 27 will cause current to flow from the transformer secondary 62 through lead wires 68 and 81 to the closed switch 27 and thence via lead wire 82 to the timer motor lead wire 79 thus maintaining the motor 22 in operation for a complete revolution or cycle of cam 23 which may be timed to cover a burner trial starting interval of say two minutes. Upon lapse of this interval, the cam recess 25 will again come into line with thrust rod 26 so that spring 28 will open the switch 27 as it moves rod 26 into the recess, thereby breaking the holding circuit 81, 82 for the timer motor. This opening of switch 27 will stop the timer motor due to prior breaking or interruption of the room thermostat timer motor circuit as will be hereinafter described. During the interval of rotation of cam 23 and within a few seconds after closure of switch 27, the finger 29 of cam 24 will engage the cam surface 30 of thrust member 31 and move switch 32 of the two motor starting switches 32, 33 to closed position. This cam operation of rod 34 will rotate lever 41 into holding relation to magnet 44 which was energized upon closure of room thermostat 69 and is held energized by closure of shunt switch 27, its circuit being from switch 27 through lead wires 82 and 83 to the closed flow switch 18 and thence to one of the magnet terminals by lead wire 84, the holding magnet circuit being completed to the transformer secondary 62 through lead wires 85 and 80. When the lost motion between thrust rods 34 and 35 has been taken up which may occur prior to closure of switch 32, the continued endwise movement of the thrust member 31 by cam finger 29 will close the second switch 33 of the motor starting switches and will break circuit at switch 49 of the thermostat timer motor circuit and will also close contacts 54, 56 of switch 49ᵃ to establish the circuit of holding magnet 61 from the room thermostat 69 through lead wire 75 to switch 49 and thence to one terminal of the the magnet 61 by lead wire 86, the circuit continuing from magnet 61 through lead wires 87, 85 and 80 to the transformer secondary 62. The armature lever 58 is positioned in holding relation to magnet 61 by this cam operation of thrust rod 35 so that the motor switch 33 and the contacts 54, 56 of switch 49ᵃ are held closed under the control of the room thermostat 69, the magnet 61 serving to maintain its own energization circuit through contacts 54, 55 due to its holding of armature lever 58 in actuated position. Closure of motor switches 32, 33 will thus establish a high voltage circuit from the service line through the flame controlled relay 78 to the burner motor 6 as follows: From main lead wire 66 through safety limit control 67, lead wire 88, closed switch 33, lead wire 89, relay arm 90 and switch 91, lead wire 92 to and through closed switch 32, lead wire 98 to one terminal of motor 6 and thence from the other motor terminal, through lead wires 99 and 95 to main lead wire 65. Operation of motor 6 will drive the pump 7 to draw fuel from the source of supply through conduit 8 and discharge the liquid fuel through condut 9 to the control device 10, building up pressure in the chamber 11 against piston 14. As the pump discharge pressure builds up, piston 49 will be moved against the force of spring 16 and fuel will feed through the valve 15 to nozzle 4. When the fuel pressure in chamber 11 on piston 14 has increased to the desired spraying pressure which is indicative of an ignitable discharge of fuel at the nozzle 4, the piston 14 will have been moved to a position below magnet 17 at which the magnetic force will have actuated switch 18 to open position. The closure of switch 33 also completed the ignition circuit through closed relay switch 91 and thence via lead wire 93 to the primary of ignition transformer 94. Therefore, at the time of energization of burner motor 6, the transformer 94 was likewise energized so that high tension current from the ignition transformer secondary 96 will be fed to the spark electrodes 97 thus providing a continuous ignition spark prior to discharge of fuel spray from nozzle 4. Therefore, the fuel mixture discharged at the burner by the combined action of fan 5 and pump 7 will, if ignitable, instantly be ignited by the ignition spark substantially coincident with the opening of switch 18 to deenergize holding magnet 44 so that spring 43 will return the thrust rod 34 to the position shown thereby opening the motor starting switch 32 which will break the only then existing circuit to motor 6. The occurrence of flame at the burner is however instantly recognized by the electron discharge means controlling the relay 78, which when energized, shunt circuits the switch 32 by closure of relay switch 100 thereby providing a motor reenergization or maintaining circuit from motor switch 33 through lead wire 89, closed switch 100 and lead wire 101 to the motor 6. The flame responsive energization of relay coil 102 normally occurs substantially instantaneously with opening of flow switch 20 so that no hesitation of pump operation occurs. Since the control device 10 requires a building up of pump pressure to the desired spraying pressure before permitting flow to the nozzle 4, as above described, and as this spraying pressure is that at which switch 18 is opened, the circuit for the burner motor 6 is broken before or substantially as the fuel is ignited. However, the inertia of motor rotation will carry or hold over the pump pressure, permitting some time lag, so as to maintain the pump spray discharge until coil 102 closes the alternate motor circuit switch 100. Therefore the starting circuit for the motor 6 is preferably broken before the operating motor circuit is completed through switch 100, without the control system blocking itself out resulting from failure to pick up flame. Upon the occurrence of a proper flame at the burner, the light rays from the flame acting on cell 121 will reduce the resistance of the cell to current flow, so that the negative charge on grids 106 and 107 will be partially dissipated or leaked to ground thereby rendering the control grid 107 sufficiently less negative, i. e. more positive, so that the electron discharge from the cathode 105 to the anode 104 will permit current flow through the relay 102 from the transformer secondary 111. Energization of relay coil 102 by current flow through tube 103 will act to open relay switches 77 and 91 and close the relay switch 100. If the control grid 107 is shorted to ground by a short circuit from lead wire 120 or if cell 121 becomes shorted, then the full negative bias will be applied to the screen grid 106 thus blocking electron discharge to the anode and deenergizing the tube or valve 103. Should such a short circuit occur during operation of the burner and subsequent to lapse of the trial starting period after magnet 44 has been deenergized, the circuit of motor 6 will be broken at the switch 100 and ignition will be instantly reestablished by closure of switch 91. Should there be a flame failure for any reason after closure of switch 100 by relay coil 102 such as to deenergize the relay coil, or should the relay coil become deenergized for any reason, the switch 100 will instantly be opened thereby stopping the burner motor 6 and as above noted, simultaneously establishing reignition at the spark electrodes 97.

In order to restart the burner motor 6 the timer motor 22 must again be placed in operation. Since the timer motor shunt circuit is open at the switch 27 and the thermostat timer motor circuit is open at contacts 53, 55 of switch 49, the thermostat circuit controlling the holding magnet 61 must be broken in order to close switch contacts 53, 55. The holding magnet may be deenergized by opening the manual switch 68ª which may be located adjacent the burner if desired, or by normally opening the room thermostat contacts by reducing its temperature setting. If now the switch 68ª or the room thermostat contacts are again closed, a timer motor circuit through switch 49 will be completed to initiate the burner trial starting period as above described. If more than one cam finger 29 is provided, then should there be a flame failure during the starting interval such that relay coil 102 becomes deenergized, the relay switch 91 would be closed thereby stopping operation of the burner motor 6 until the second or subsequent cam finger 29 engaged the rod cam surface 30 to close switch 32, the switch 33 of course remaining closed since the circuit of holding magnet 61 has not been opened at the switch contacts 54, 56. During this retrial of burner starting, the ignition would of course be on by reason of closure of switch 91 when flame failed, so that an igniting spark would be present should the fuel spraying pressure again be reached prior to completion of rotation of cam 23 so that the sprayed fuel would be ignited, then recognition of flame as above described would energize relay 102 and close the burner motor switch 100, deenergizing the ignition transformer and shunting the motor switch 32 as above described.

The thermostat 69 may be so constructed that upon prolonged continuous energization of heater 73 upon a call for heating by the thermostat and such as would occur on failure of the heat supply from the heating apparatus, the heater 73 will generate sufficient heat to cause the room thermostat to be opened automatically thereby deenergizing its resistance heater 73 and the holding magnet 61. When the blade 70 cools due to discontinuance of heat from resistance 73, the circuit will again be made at contacts 71, 72 thereby automatically restarting the burner. If, therefore, burner motor 6 is stopped by reason of flame failure, the system will, after timer motor 22 has completed its burner starting cycle, be automatically restarted by the automatic opening and closing of the room thermostat 69.

When the room thermostat 69 becomes satisfied thereby separating contacts 71, 72 or if these contacts, after motor 22 stops, or either of the switches 67 or 68a are opened for any reason, the burner motor 6 will be stopped, because the motor switch controlling magnet 61 will be deenergized. Stopping of the burner will place the system in condition for restarting as soon as the pump pressure decreases sufficiently to permit closure of flow switch 18 by spring 21.

Referring to the control apparatus or system of Fig. 2, there is a heating apparatus 130 such as a boiler or furnace for supplying heating medium to a room or other space and having a liquid fuel burner 131 controlled by a main control switch or room thermostat 132 responsive to the temperature of the mdium which is heated either directly or indirectly by the heating apparatus 130. The burner 131 has an electric motor 133 which drives an oil pump 134 and a fan or blower 135 for supplying combustion air through the burner tube 136 into the combustible chamber. The pump 134 draws fuel from an oil tank through conduit or pipe 137 and discharges it through pipe 138 to the burner nozzle 139. A pressure responsive switch 140 is operated by a pressure responsive element 141 such as a metallic bellows having its interior connected into the pump discharge pipe 138. The switch 140 is urged toward open position to maintain the switch contacts 142, 143 normally in separated relation. The bellows 141 acts to close switch 140 at a predetermined pressure in conduit 138 which is indicative of a discharge of fuel at ignitable spraying pressure from nozzle 139.

A timer means or motor 144 acts when energized to drive switch operating cams 145, 146 and 147. The cam 145 acts immediately at the start of its rotation to close a circuit holding or maintaining switch 148 to keep motor 22 in operation for a complete revolution, the switch 148 being in shunt circuit with the thermostat switch 132. The cam 145 operates to close the switch 148 through a guided thrust rod 149 against the force of a switch opening spring 150, the rod 149 seating when motor 22 is deenergized in a cam recess 151. The rotation of cam 145 forces the thrust rod out of recess 151 and on to the cylindrical cam surface thereby closing switch 148, the thrust rod 149 riding on the cylindrical surface through the remainder of rotation of cam 145 which covers a predetermined interval or period of say two minutes. When the cam 145 has completed its rotation, the spring 150 will move thrust rod 149 into recess 151 thereby opening the switch 148 and stopping the motor 22 as the thermostat circuit to motor 22 will then have been broken. The cam 146 has a cam finger 152 engageable with the inclined cam surface 153 of a guided switch operating thrust rod 154 operatively connected to a motor starting switch 155, a timer motor starting switch 156 and a holding magnet control switch 157. The switch 155 has a resilient operating arm or blade 158 carried by a supporting member 159 of electric insulating material and extending at its free end into a transverse slot in rod 154. The blade 158 carries a contact 160 normally spaced from and cooperable with a contact 161 carried by a resilient switch arm or blade 162 secured to the supporting member 159. Switches 156 and 157 have a common resilient operating arm or blade 163 carried by the supporting member 159 and having its free end extending into a transverse slot in the rod 154. The blade 163 carries oppositely directed contacts 164, 165 forming part of switches 156, 157 respectively. The contact 164 is normally in engagement with a contact 166 carried by a resilient switch arm or blade 167 secured to the supporting member 159. The contact 165 is spaced from but engageable with a contact 168 of a resilient switch arm 169 secured to the supporting member 159. A pivoted armature lever 170 has a pin and slot or similar connection to the rod 154 and has a spring 171 acting thereon to hold its free end against an abutment member or stop 172 which limits the movement of rod 154 toward cam 146 and determines the position of switch arms 158 and 163. The free end of lever 170 acts as an armature for cooperation with an electromagnet 173 which when energized, is ineffective to overcome spring 171, but has sufficient holding force to hold the lever 170 in its cam operated position against the force of spring 171. The cam 147 acts on a two-part thrust member 174 having aligned guided thrust rods 175, 176 between which is positioned a displaceable thrust transmitting ball 177. The thrust member 174 is longitudinally moved by the cam 147, the rod 175 seating in a cam recess 178 out of which the rod is forced upon rotation of the cam 147 to thereafter ride on the cylindrical cam surface until the cam completes its rotation when the return spring 179 will reseat the rod 175 in recess 178. Longitudinal movement of member 174 by cam 147 will position the ball 177 in alignment with an operating pin 180 which may be operated by an electromagnet 181 to force the ball 177 upward against the force of a spring 182 and out of abutting force transmitting relation to the end of thrust rod 176. The thrust rod 176 is operatively connected to a releasable burner motor starting switch 183 having a resilient switch arm or blade 184 secured to a supporting member 185 of electric insulating material. The free end of blade 184 extends into a transverse slot in the rod 176 so that on longitudinal movement of thrust member 174 by cam 147, a contact 185a on arm 184 is engaged with the contact 186 on a resilient arm or blade 187 carried by the supporting member 185 thereby closing switch 183. A spring 188 opposing cam operation of rod 176 acts to move switch 183 to open position upon displacement of ball 177 by pin 180. When cam 147 completes its rotation so that rod 175 is again seated in recess 178 by spring 179, the ball 177 will be carried therewith and be forced by spring 182 into its longitudinal endwise relation to and between rods 175, 176.

The fuel igniting means includes a high tension ignition transformer 189 having a primary winding 190 and a secondary winding 191 which is connected by lead wires to the spark electrodes 192 having their gap positioned in the path of the combustible mixture from nozzle 139 and the air tube 136.

The ignition transformer primary winding 190 is controlled by a flame operated relay 193 having an operating coil 194, which when energized, acts to open the closed relay safety switch 195 and the closed ignition switch 196. One contact of the ignition switch is carried by a relay arm 197 which also carries the movable contact 198 of an open burner motor switch 199 in shunt or parallel circuit with the motor starting switch 183. The relay coil 194 is controlled by an electron discharge means 200 included in an electric network 201, an electronic valve or tube 202 and an electrostatic discharge electrode 203 cooperable with the burner flame. The electronic valve 202 has an anode 204 separated from the cathode 205 by a screen grid 206 and a control grid 207. A filament heater 208 for the cathode has one side electrically connected as at 209 to the cathode and has its other side connected to one side or plate of a condenser 210 which has its other side or plate connected to the control grid 207. The control electrode 203 is electrically connected by a lead wire 211 to the control grid 207 and its other side of condenser 210. The filament heater 208 is energized by a transformer 212 having its low voltage secondary 213, of say 6 volts, connected by a lead wire 214 to the filament and cathode 209. The other side of transformer 213 is connected by a lead wire 215 to the remaining filament terminal and the filament side of condenser 210. The screen grid 206 is connected to ground by a lead wire 216. From the lead wire 216 a lead wire 217 connects the screen grid 206 to the cathode and filament lead wire 214. From the junction of lead wires 214 and 217 and their connection to the cathode 205 there is a lead wire 218 extending to the secondary winding 219 of a transformer 220. From the other side of transformer secondary 219 a lead wire 221 extends to one terminal of the relay coil 194, the other terminal of coil 194 being connected by a lead wire 222 to the anode 204.

The control apparatus is supplied with current from main line or service lead wires 224, 225, the wire 224 being connected to one side or terminal of a safety or limit switch 226 responsive to temperature or pressure of the heating apparatus 130. From the other side of switch 226 a lead wire 227 connects to one terminal of the primary 228 of transformer 220 and a second lead wire 229 connects to the fixed blade 162 of burner motor starting switch 155. The other terminal of transformer primary 228 is connected by a lead wire 230 to the service wire 225. From the cam operated switch arm 158 of the burner and ignition switch 155 a lead wire 231 extends to the relay arm 197. From the fixed contact of relay switch 196 a lead wire 232 connects to one terminal of the ignition transformer primary 190 which has its other terminal connected by a lead wire 233 to a lead wire 234 extending from the service wire 225 to one terminal of the burner motor 133. From the other terminal of motor 133, a lead wire 235 connects to the fixed contact of relay switch 199. The motor starting switch 183 is in parallel or shunt circuit with the relay switch 199 and has its cam operated arm 184 connected by a branch lead 236 to the lead wire 231 and has its fixed contact arm 187 connected by a lead wire 237 to the motor lead wire 235.

The timer motor 144 is energized from the secondary winding 238 of transformer 220. From one terminal of the transformer secondary 238, a lead wire 239 extends to the temperature responsive element 240 of switch 132 and contains a normally closed manual switch 241. From the fixed contact 242 of switch 131 a lead wire 243 connects to the cam operated arm 163 of the double throw switches 156, 157. From the fixed contact arm 167 of switch 156 a lead wire 244 extends to the fixed contact of relay switch 195. From the movable contact of switch 195 a lead wire 245 connects to one terminal of the timer motor 144. From the other terminal of the timer motor a lead wire 246 returns to the other side or terminal of transformer secondary 238. The timer holding switch 148 has its movable switch arm 246 connected by a lead wire 247 to the thermostat lead wire 239, the fixed arm or contact 248 of switch 148 being connected by a lead wire 249 to the timer motor feed wire 245. The room thermostat 132 is preferably provided with a compensating resistance heater 250 which is electrically connected to the thermostat contact 242 and which connects by a lead wire 251 to the transformer secondary 238 via the timer motor lead wire 246. The coil of holding magnet 173 has one terminal connected by a lead wire 252 to the fixed arm 169 of switch 157 and has its other terminal connected by a lead wire 253 to the transformer secondary 238 via the timer motor lead wire 246. The thrust member release magnet 181 has one terminal of its coil connected by a lead wire 254 to the timer motor lead wire 246 and has its other terminal connected by a lead wire 255 to the movable contact 142 of pressure operated switch 140. From the fixed contact 143 of pressure switch 140 a lead wire 256 connects to the lead wire 239 on the transformer side of switch 241. The filament transformer 212 has its primary connected across the service wires 224, 225 by lead wires 257, 258 respectively.

The operation of the control system or apparatus of Fig. 2 is as follows: Upon closure of the control switch 132 as by a demand for temperature increase, the limit switch 226 and manual switch 241 being closed, a low voltage circuit will be established from the transformer secondary 238 through lead wire 239 and closed switch 132 to lead wire 243, thence through closed timer starting switch 156, lead wire 244, closed safety relay switch 195, lead wire 245 to the timer motor 144 and through lead wire 246 back to the transformer secondary 238. The closure of switch 132 will also energize the compensating heater 250 to impress a false ambient temperature on the responsive element 240 so as to compensate for lag in response of the element 240 thereby preventing overheating of the room or other space by the heating apparatus 130. Initial rotation of the cam 145 by motor 144 will within a few seconds of energization of motor 144, close the timer motor holding switch 148 for a predetermined burner trial starting period. The closure of switch 148 completes a shunt or parallel circuit around the control switch 132, the circuit being from transformer secondary 238 through lead wires 239 and 247 to switch 148 and thence via lead wires 249 and 245 to the timer motor 144, the lead wire 246 completing the circuit from the timer motor back to the transformer secondary 238. Simultaneously with or directly following closure of switch 148, the cam finger 152 will engage the thrust rod cam surface 153 and move the thrust rod 154 against the force of spring 171 thereby closing the motor starting switch 155, opening the timer motor starting circuit at switch 156 and closing the circuit for the holding magnet 173 at switch 157. The thrust rod 154 will therefore be held in its operated position by the magnetic force of electromagnet 173 on armature lever 170, the magnet 173 thus having its circuit controlled and maintained at the room thermostat switch 132.

As the motor and ignition switch 155 moves to closed position, the cam 147 will move thrust member 174 against the force of springs 179 and 188 to close the motor starting switch 183. The circuit to the burner motor 133 will thus be completed as follows: From service wire 224 through limit switch 226, lead wire 229, closed motor switch 155, lead wires 231 and 236, closed motor starting switch 183, lead wires 237 and 235 to one terminal of the motor 133 and thence from the other motor terminal via lead wire 234 to service wire 225. The closure of motor switch 155 will also establish ignition at the burner through the closed ignition relay switch 196 which is in parallel with the motor switch 183, the circuit being from closed motor switch 155 via lead wire 231, closed ignition relay switch 196, lead wire 232, to one terminal of the ignition transformer primary 190 and thence from the other primary terminal via lead wire 233 to lead wire 234 which connects to the service wire 225. The operation of the burner motor 133 will drive the blower 135 and the pump 134 and when the pressure in the pump discharge conduit 138 has increased to the desired spraying pressure, the pressure responsive bellows 141 will close switch 140 thereby energizing the actuating magnet 181 which has its circuit completed as follows: From transformer secondary 238 via lead wire 256, closed pressure switch contacts 143 and 142, lead wire 255, to the coil of magnet 181 and thence via lead wire 254 to lead wire 246 connected to the transformer secondary 238. Energization of magnet 181 will move pin 180 upward against thrust ball 177 which has been moved into overlying relation with the pin 180 by cam 147. The pin 180 will force the ball 177 upward out of holding relation to thrust rod 176 so that spring 188 will move rod 176 toward the left to the position shown, thereby opening the motor switch 183. When cam 147 completes its rotation, spring 179 will move thrust rod 175 to the position shown in cam recess 178 and spring 182 will move ball 177 back into thrust transmitting relation to thrust rod 176. The switch 183 will only be opened during the burner trial starting interval providing the desired fuel spraying pressure has been built up by pump 134 to close the switch 140. The occurrence of this spraying pressure which will close switch 140, causes discharge of an ignitible spray at nozzle 139 for mixture with the combustion air discharge from tube 136. The combustible mixture will be instantly ignited by the continuous ignition spark between electrodes 192 which was established simultaneously with energization of motor 133.

Therefore, although the burner motor circuit is broken at the switch 183, occurrence of flame will be instantly recognized by the electronic discharge means 200 which will complete the circuit of relay coil 194 thereby closing the motor shunt switch 199. The closure of switch 199 will maintain energization of or will reenergize the burner motor 133 with substantially no loss of pump discharge pressure so that the flame established will continue without interruption.

The electronic valve 201 has its control grid negatively charged during positive charge of the anode 204 by reason of the condenser connection 210 between the control grid 207 and the filament heater circuit. When, however, operation of the burner provides a flame of proper mass, the electrostatic discharge from electrode 203 will leak off or dissipate sufficient of the negative control grid charge to render the valve 201 conductive and sufficient current will flow through the relay coil 194 from transformer secondary 213 to actuate switches 195 and 196 to open position and to close the burner motor switch 199.

Should the pump 134 fail to build up sufficient pressure by reason of lack of oil, air leakage or other reasons, or should the switch 140 fail to close during the burner starting interval, then upon lapse of the starting interval, the magnet 181 not having been energized, the thrust member 174 will be returned to the position shown thereby opening switch 183 and stopping further operation of the burner motor 133. Continued operation of timer motor 144 will also be stopped since substantially simultaneously with such opening of switch 183 the timer motor holding switch 148 will also be opened. In order to restart the burner motor the holding magnet 173 must be deenergized which may be accomplished by opening of switch 241 in the thermostat circuit or manually opening the thermostat switch 132 which by deenergizing the magnet 173 will release rod 154 from its held position thereby opening the switches 155 and 157 and closing the timer motor starting switch 156. The burner may then be restarted as above described by closure of control switch 132 or manual switch 241, whichever had been opened.

Should there be a flame failure or should the flame mass decrease so as to build up a negative blocking charge on control grid 207 sufficiently to deenergize relay coil 194, then the motor switch 199 will be moved to open position and the ignition switch will be closed. Since switch 183 will have been opened by operation of the magnet 181 on ball 177, the opening of switch 199 will stop the burner motor 133 but ignition will immediately be established by closure of switch 196. The timer motor 144 if still energized, will continue in operation until the burner starting interval has been completed when it will stop itself by opening of its circuit at switch 148. Restarting of burner operation is thereafter accomplished by the opening and subsequent closing of switch 241 or of the control switch 132 as above described.

Should there be a failure of flame or the flame mass decrease such as to deenergize the relay coil 194 after lapse of the starting interval of operation of timer motor 144, then the deenergization of relay coil 194 will stop the burner motor 133 and instantly reestablish ignition as last described. The restarting of the burner will, as above described, require the opening and subsequent closing of either the manual switch 241 or the control switch 132.

It may be noted that the negative control grid charge of valve 103 may be dissipated on the occurrence of flame mass by an electrostatic discharge electrode such as described in connection with Fig. 2. Such an electrode, however, has certain disadvantages which are overcome by the use of the cell 121. The electrode is more sensitive to variations in the flame characteristics, is more subject to short circuiting due to necessary wiring and is less convenient of installation. The use of such an electrode also requires a reduction in the capacity of the condenser 118 primarily due to the increased capacitance resulting from the change to an electrode.

What is claimed and desired to be secured by Letters Patent of the United States is:

1. In a fluid fuel burning apparatus, a burner, a motor, means driven by said motor to supply fuel to said burner, means to ignite the fuel discharged at said burner, means actuated substantially coincident with the discharge of an ignitable amount of fuel from said burner to deenergize said motor to ultimately deactivate said fuel supply means, and means operable substantially coincident with ignition of the fuel to further establish the supplying of fuel.

2. In a fluid fuel burning apparatus, a burner, a motor, means driven by said motor to supply fuel to said burner, means to ignite the fuel discharged at said burner, means operable substantially coincident with the discharge of an ignitable amount of fuel from said burner to deenergize said motor to ultimately deactivate said fuel supply means, and electronic tube control means responsive to occurrence of flame at said burner and operable substantially coincident with occurrence of flame to further establish the supplying of fuel.

3. In a fluid fuel burning apparatus, a burner, a motor, means driven by said motor to supply fuel to said burner, means to ignite the fuel discharged at said burner, means operable substantially coincident with the discharge of an ignitable amount of fuel from said burner to break a circuit for said motor to ultimately deactivate said fuel supply means, and photo-electric means responsive to occurrence of flame at said burner to further establish the supplying of fuel.

4. In a fluid fuel burning apparatus, a burner, a motor, means driven by said motor to supply fuel to said burner, means to ignite the fuel discharged at said burner, means operable substantially coincident with the discharge of an ignitable amount of fuel from said burner to break a circuit for said motor to ultimately deactivate said fuel supply means, electron discharge means having a network, means operable by said discharge means to further establish operation of said fuel supply means substantially simultaneously with the breaking of said circuit, and a static discharge electrode cooperable with an operating flame mass to render said discharge means operable.

5. In a fluid fuel burning apparatus, a burner, a motor, means driven by said motor to supply fuel to said burner, means to ignite the fuel discharged at said burner, means operable upon the discharge of an ignitable amount of fuel from said burner to deenergize said motor to ultimately deactivate said fuel supply means, and means operable substantially coincident with ignition of the fuel and deenergization of said motor to establish a circuit for continuing the operation of said motor and to discontinue operation of said igniting means.

6. In a fluid fuel burning apparatus, a burner, a motor, means driven by said motor to supply fuel to said burner, means to ignite the fuel discharged at said burner, means actuated by and directly controlling fuel flow to said burner and operable upon actuation to break the motor circuit to ultimately deactivate said fuel supply means, and means operable upon ignition of the fuel to establish a circuit for maintaining operation of said motor.

7. In a liquid fuel burning apparatus, a burner, a pump for supplying liquid fuel under pressure to said burner, means to drive said pump, means to ignite the fuel discharged at said burner, means operable upon occurrence of predetermined fuel pressure to deenergize said pump driving means, and means responsive to the fuel flame at said burner to energize said pump driving means to continue the supplying of fuel.

8. In a liquid fuel burning apparatus, a burner having a fuel supply conduit, a pump for supplying fuel under pressure to said conduit, an electric circuit for said pump, means to ignite the fuel discharged at said burner, a timer motor, means including a running switch operable by said timer motor to energize said igniting means and to start operation of said pump, a switch operable by said timer motor and controlling said electric circuit and operable upon expiration of a predetermined interval of timer motor operation to stop operation of said pump, a main switch, electromagnetic means energized by closure of said main switch and by operation of said timer motor and operable to hold said running switch closed upon initial closure of said running switch by said timer motor, and means responsive to occurrence of flame at said burner and operable to maintain operation of said pump beyond said interval to establish a circuit in cooperation with said running switch and simultaneously to stop operation of said igniting means.

9. In a liquid fuel burning apparatus, a burner, a pump for supplying fuel under pressure to said burner, a timer motor, a switch closed by said motor to maintain operation of said motor for a predetermined interval, a pair of pump controlling switches in series circuit and closed by said motor, means to hold one of said pump switches closed, means to ignite the fuel supplied to said burner, a relay having an open pump switch in parallel with the other of said pump switches, means responsive to a fuel pressure indicative of discharge of an ignitable supply of fuel at said burner and operable to open said other of said pump switches, and means instantly acting upon flame at said burner to operate said relay to close said open relay switch thereby to maintain operation of said pump.

10. In a liquid fuel burning apparatus, a burner, a pump for supplying fuel under pressure to said burner, a timer motor, a switch closed by said motor to maintain operation of said motor for a predetermined interval, a pair of pump controlling switches in series circuit and closed by said motor, means to hold one of said pump switches closed, means to ignite the fuel supplied to said burner, a relay having an open pump switch in parallel with the other of said pump switches, said relay having a closed ignition switch controlling said igniting means, means responsive to a fuel pressure indicative of discharge of an ignitable supply of fuel at said burner and operable to open said other of said pump switches, and means instantly acting upon flame at said burner to operate said relay to open said ignition switch and to close said open relay switch thereby to maintain operation of said pump.

11. In a liquid fuel burning apparatus, a burner, a pump for supplying fuel under pressure to said burner, a timer motor, a switch closed by said motor to maintain operation of said motor for a predetermined interval, a pair of pump controlling switches in series circuit and closed by said motor, magnetic means energized by operation of said motor and acting to hold one of said pump switches closed, means to ignite the fuel supplied to said burner, a relay having an open pump switch in parallel with the other of said pump switches, means responsive to a fuel pressure indicative of discharge of an ignitable supply of fuel at said burner and operable to open said other of said pump switches, means instantly acting upon flame at said burner to operate said relay to close said open relay switch thereby to maintain operation of said pump, and means to deenergize said magnetic means to stop operation of said pump.

12. In a fluid fuel burner control apparatus, a burner motor, a circuit for said motor, a motor starting switch for said circuit, means to close and then to open said switch, electric fuel ignition means, a circuit for said ignition means, a closed relay switch controlling said motor circuit and said ignition means circuit, an open relay switch operable to close a second circuit to said motor, and electron discharge means instantly responsive to a burner operating flame and controlling said relay switches to open said closed switch to break said ignition means circuit and said first named motor circuit and to close said open switch to maintain operation of said motor after said starting switch is opened.

13. In a fluid fuel burner control apparatus, a burner motor, a burner switch operable to close a circuit to said motor, electric fuel ignition means, a closed relay switch controlling said circuit and said ignition means, an open relay switch operable to close a second circuit to said motor, means responsive to a fuel pressure and fuel flow indicative of an ignitable fuel discharge, means controlled by said pressure and flow responsive means and operable to open said burner switch, and electron discharge means instantly responsive to a burner operating flame and controlling said relay switches to open said closed switch to deenergize said ignition means and to close said open switch to energize said motor.

14. A fluid fuel burner control apparatus comprising a burner, a room thermostat, a timer motor, a current source for supplying said timer motor and controlled by said room thermostat, a closed timer motor switch in circuit with said thermostat and opened by operation of said timer motor, an open timer motor switch shunting said thermostat and closed by said timer motor prior to opening of said closed switch, a burner motor, a pair of open burner motor controlling switches in series circuit, means operable by said timer motor to close said burner switches upon opening of said closed switch, a holding magnet for maintaining one of said burner switches in closed position and controlled by said room thermostat, a holding magnet for maintaining the other of said burner switches in closed position and controlled by said open timer motor switch, a switch responsive to a fuel pressure indicative of discharge of an ignitable supply of fuel at said burner and operable to deenergize said second-named magnet, means to ignite the fuel discharged at said burner, and means responsive to occurrence of flame at said burner and operable to discontinue operation of said igniting means and to establish a burner motor circuit from said one of said burner switches.

15. A fluid fuel burner control apparatus comprising a burner, a room thermostat, a timer motor, a current source for supplying said timer motor and controlled by said room thermostat, a closed timer motor switch in circuit with said thermostat and opened by operation of said timer motor, an open timer motor switch shunting said thermostat and closed by said timer motor prior to opening of said closed switch, a burner motor, a pair of open burner motor controlling switches in series circuit, means operable by said timer motor to close said burner switches upon opening of said closed switch, a holding magnet for maintaining one of said burner switches in closed position and controlled by said room thermostat, a holding magnet for maintaining the other of said burner switches in closed position and controlled by said open timer motor switch, a switch responsive to a fuel pressure indicative of discharge of an ignitable supply of fuel at said burner and operable to deenergize said second-named magnet, means to ignite the fuel discharged at said burner, a relay having a closed switch in series with said one burner switch and controlling current flow to said igniting means and to said other burner switch, said relay having an open switch in series with said one burner switch, and electron discharge means instantly recognizing a burner operating flame and controlling said relay to open said closed relay switch and to close said open relay switch.

16. A liquid fuel burner control apparatus comprising a burner, a pump for supplying fuel to said burner, a timer motor having a circuit, a room thermostat to close said circuit, an open shunt switch in shunt circuit with said thermostat, a cam operable by said motor and operable to close said switch, a holding magnet in circuit with said switch, a pressure opened switch responsive to pump fuel pressure and controlling current flow from said shunt switch through said magnet, a second cam operable by said timer motor, a pump motor, a first pump motor switch urged toward open position and movable to closed position and holding relation to said magnet by operation of said second cam subsequent to closure of said shunt switch, a second pump motor switch in series circuit with said first pump motor switch, a closed flame controlled relay switch in series circuit with said first and said second pump motor switches, means operable by said second cam to close said second pump motor switch, a holding magnet to maintain said second pump motor switch in closed position, a switch in circuit with said room thermostat and closed upon closure of said second pump motor switch to hold said second magnet energized under control of said room thermostat, an open flame controlled relay switch in shunt circuit with said first pump motor switch, electric ignition means to ignite fuel supplied to said burner by said pump and having its circuit controlled by said first-named relay switch, and electron discharge means controlling said relay switches and responsive to a proper burner flame to open said first-named and to close said second-named relay switches, said timer motor opening said shunt switch upon lapse of a predetermined interval thereby to deenergize said first-named holding magnet.

17. A liquid fuel burner control apparatus comprising a burner, a fuel pump for supplying fuel under pressure to said burner, a control switch, timer means energized by closure of said switch and closing for a burner trial starting interval a timer means holding circuit, a plurality of independently releasable pump switches in series circuit and operable by said timer means, a holding magnet for maintaining closed one of said releasable switches, means responsive to pump pressure indicative of discharge at said burner of an ignitable supply of fuel and operable to deenergize said holding magnet, electrically controlled fuel igniting means energized by closure of said one releasable switch, a flame controlled relay having a closed switch in series with said releasable switches and having an open switch in parallel with said one releasable switch, a holding magnet for maintaining another of said releasable switches in closed circuit position, switch means operable by said timer means to transfer the circuit from said control switch over to said second-named holding magnet, an electron tube in circuit with and blocking current flow through said relay, and means operable instantly upon occurrence of flame to render said tube conductive thereby to energize said relay.

18. A fluid fuel burner controlling apparatus, comprising a flame responsive electron tube relay having a closed starting switch opened by occurrence of flame, a timing means, a main control switch operable upon closure to close a circuit for said timing means through said closed starting switch, a burner motor, a burner motor controlling switch closed by said timing means, an electromagnet to hold said burner motor switch closed and controlled by said main control switch, a switch closed by said timing means and dominating the control of said electromagnet by said main control switch, a burner motor controlling switch closed by said tube relay upon occurrence of flame, and means interconnecting said last-named controlling switch and said relay starting switch so that sticking of said last-named controlling switch in closed circuit position will maintain said relay starting switch in open position thereby preventing starting of said timing means.

19. In a liquid fuel burning apparatus, a burner having a fuel supply conduit, a pump for supplying fuel under pressure to said conduit, an electric circuit for said pump, means to ignite the fuel discharged at said burner, a timer motor, circuit controlling means for said electric circuit and including a switch operable by said timer motor to start operation of said pump, a switch operable by said timer motor and controlling said electric circuit and operable upon expiration of a predetermined interval of timer motor operation to stop operation of said pump, means operable to hold said first-named switch closed upon initial closure of said first-named switch by said timer motor, and means responsive to occurrence of flame at said burner and operable during said interval to establish a circuit in cooperation with said closed switch to render said timer motor ineffective to stop operation of said pump.

20. In a liquid fuel burning apparatus, a burner, a motor, a pump driven by said motor to supply fuel at spraying pressure to said burner, a starting circuit for said motor, means operable at spraying pressure to break said circuit to ultimately deactivate said pump, a running circuit for said motor, an open switch in said running circuit, and electronic tube control means instantly acting upon occurrence of flame at said burner to close said switch.

21. In a liquid fuel burning apparatus, a burner, a motor, a pump driven by said motor to supply fuel at spraying pressure to said burner, a starting circuit for said motor, a pair of switches in series in said circuit, means operable at spraying pressure to open one of said switches to ultimately deactivate said pump, a running circuit for said motor, an open switch in said running circuit, an electronic tube control means instantly acting upon occurrence of flame at said burner to open the other of said pair of switches and to close said running circuit switch.

FRED B. AUBERT.

REFERENCES CITED

The following references are of record in the file of this patent:

UNITED STATES PATENTS

| Number | Name | Date |
| --- | --- | --- |
| 1,761,018 | Martin | June 3, 1930 |
| 1,963,771 | Ballard | June 19, 1934 |
| 1,877,248 | Macrae et al. | Sept. 13, 1932 |
| 1,818,616 | Good | Aug. 11, 1931 |
| 2,112,736 | Cockrell | Mar. 29, 1938 |
| 1,679,163 | Martin | July 31, 1928 |
| 2,299,501 | Schneider | Oct. 20, 1942 |
| 2,136,256 | Sweet | Nov. 8, 1938 |
| 2,304,200 | Plein et al. | Dec. 8, 1942 |
| 2,261,458 | Bailey et al. | Nov. 4, 1941 |
| 2,274,384 | Scanlan | Feb. 24, 1942 |
| 1,899,744 | Breisky et al. | Feb. 28, 1933 |
| 1,936,784 | Diamond | Nov. 28, 1933 |
| 2,175,017 | Cockrell | Oct. 3, 1939 |
| 2,343,001 | Cohen | Feb. 29, 1944 |
| 2,253,307 | Richter | Aug. 19, 1941 |

FOREIGN PATENTS

| Number | Country | Date |
| --- | --- | --- |
| 298,146 | Great Britain | Oct. 4, 1928 |